United States Patent [19]
Kerr

[11] Patent Number: 5,638,931
[45] Date of Patent: Jun. 17, 1997

[54] AUTOMOTIVE ACCESSORY DRIVE PULLEYS INCORPORATING SPIRAL TYPE ONE-WAY CLUTCH

[75] Inventor: John Hugh Kerr, Kingston, Canada

[73] Assignee: Ker-Train Holdings Ltd., Kingston, Canada

[21] Appl. No.: 370,846

[22] Filed: Jan. 10, 1995

[51] Int. Cl.⁶ .................................................. F16D 41/064
[52] U.S. Cl. .................................. 192/45; 192/113.32
[58] Field of Search .............................. 192/41 R, 45, 192/113.32

[56] References Cited

U.S. PATENT DOCUMENTS

| | | | |
|---|---|---|---|
| 2,866,349 | 12/1958 | Heckethorn | 192/41 R X |
| 3,444,748 | 5/1969 | Sutaruk | 192/45 X |
| 4,341,294 | 7/1982 | Kerr | 192/45 |

FOREIGN PATENT DOCUMENTS 57-9331  1/1982  Japan .................... 192/113.32

*Primary Examiner*—Richard M. Lorence

[57] ABSTRACT

An automotive accessory drive linkage is provided with a one-way clutch mounted on any of the pulleys carried by the engine crankshaft, an alternator, an hydraulic pump or generally, on the pulley for any other accessory operated by a belt linked to the engine in order to isolate such driven elements from oscillations in the engine speed.

A spiral one-way clutch especially suitable for incorporation in automotive accessory drive system pulley has a high indexing capacity. Such clutch, installed between the pulley shive and spindle operates to suppress belt oscillations during low speed engine operation, placing less critical demands on a belt tensioner, if present. It also operates to prevent belt slippage during periods when the engine is forced to decelerate rapidly during up-shifts of the transmission, effectively eliminating "belt squeal".

10 Claims, 7 Drawing Sheets

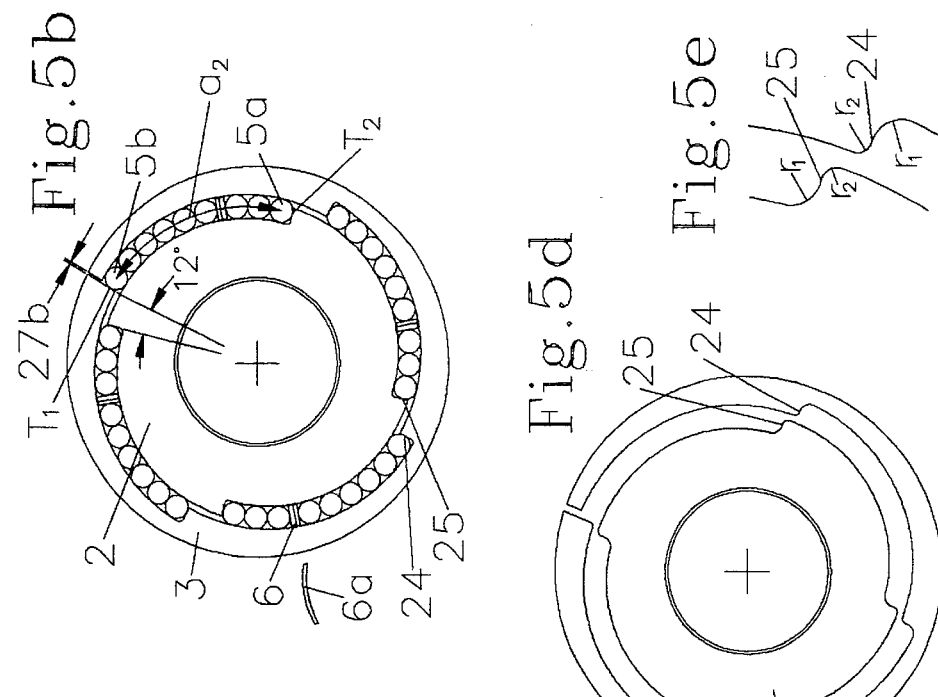
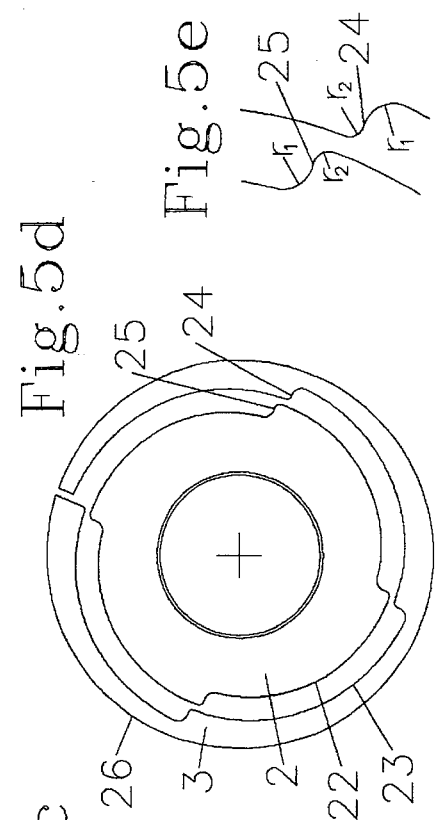
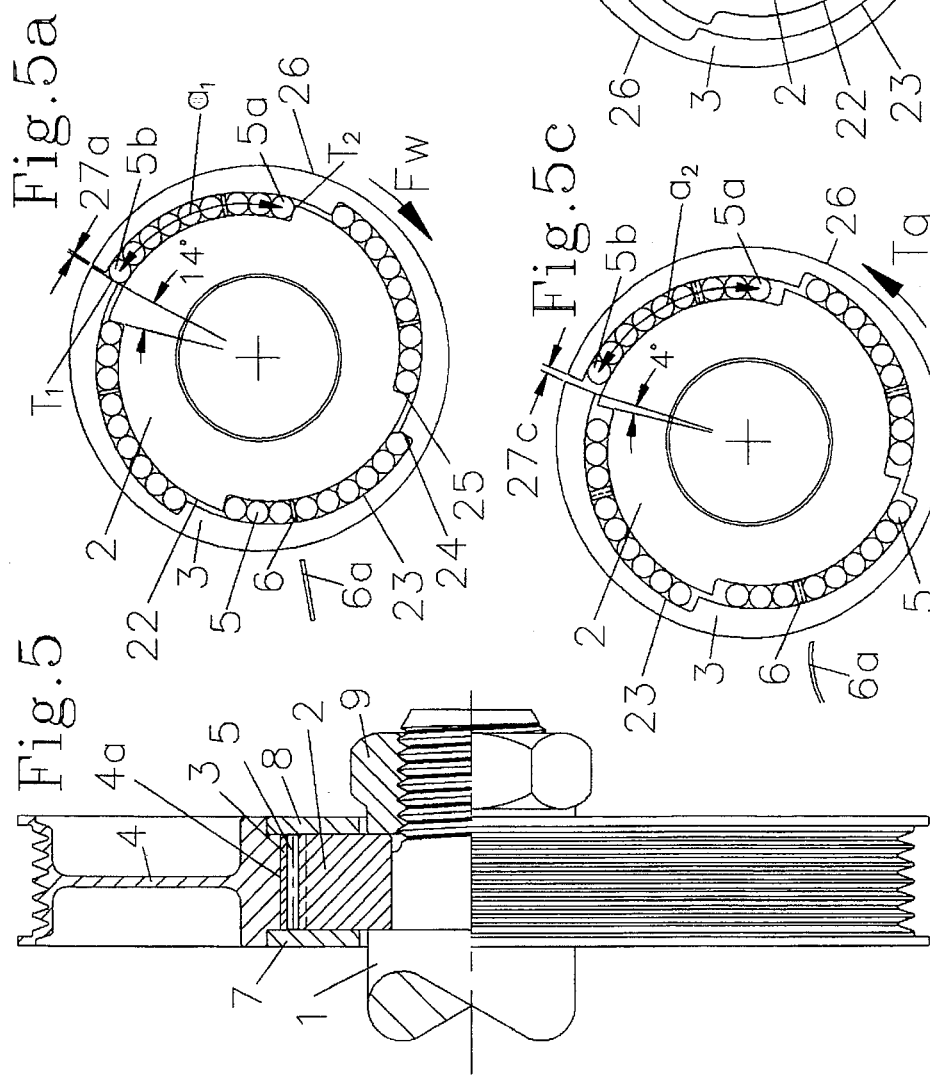
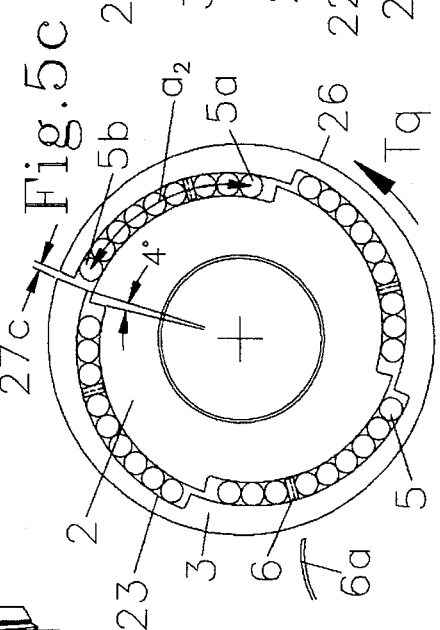

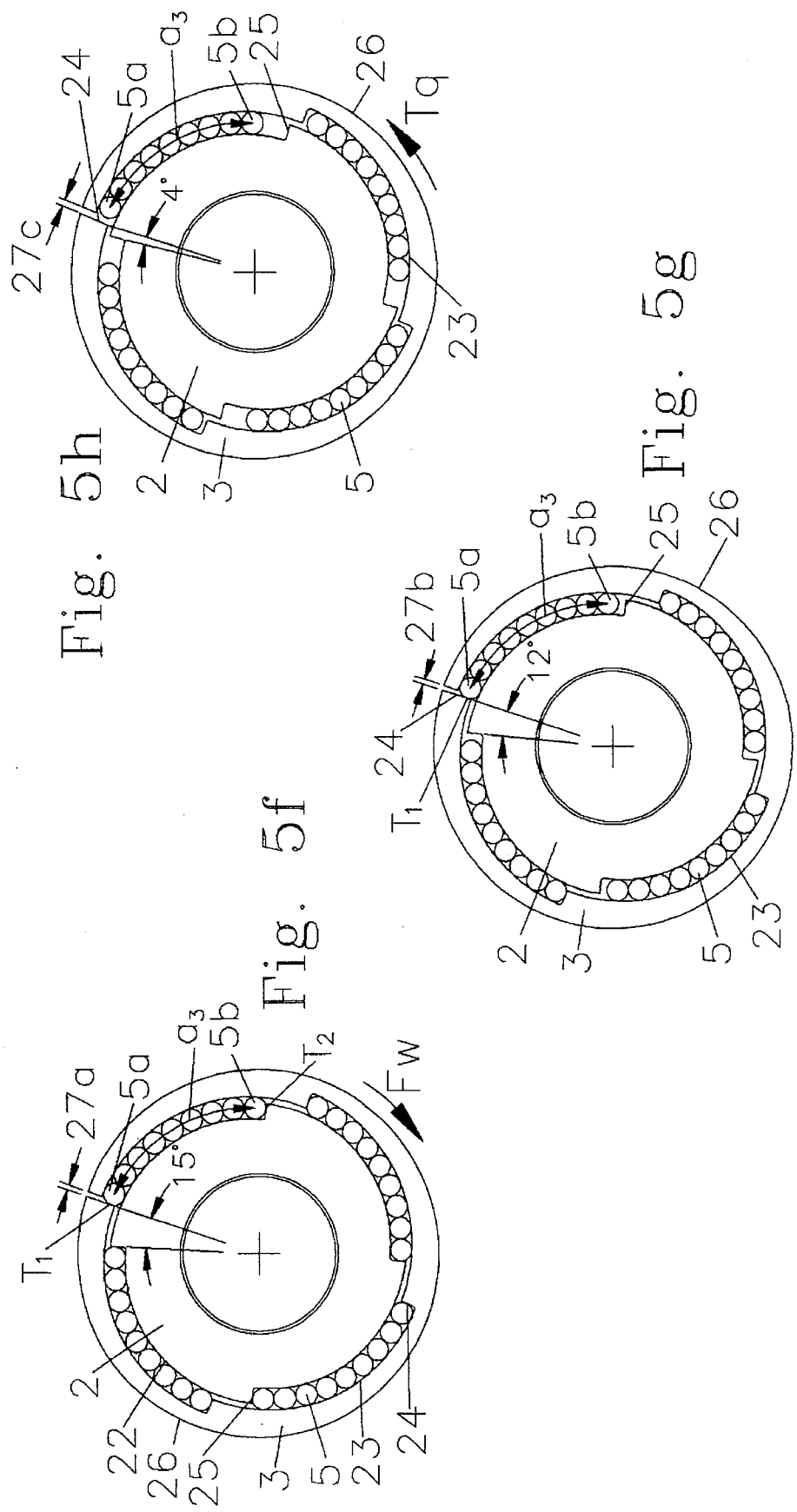

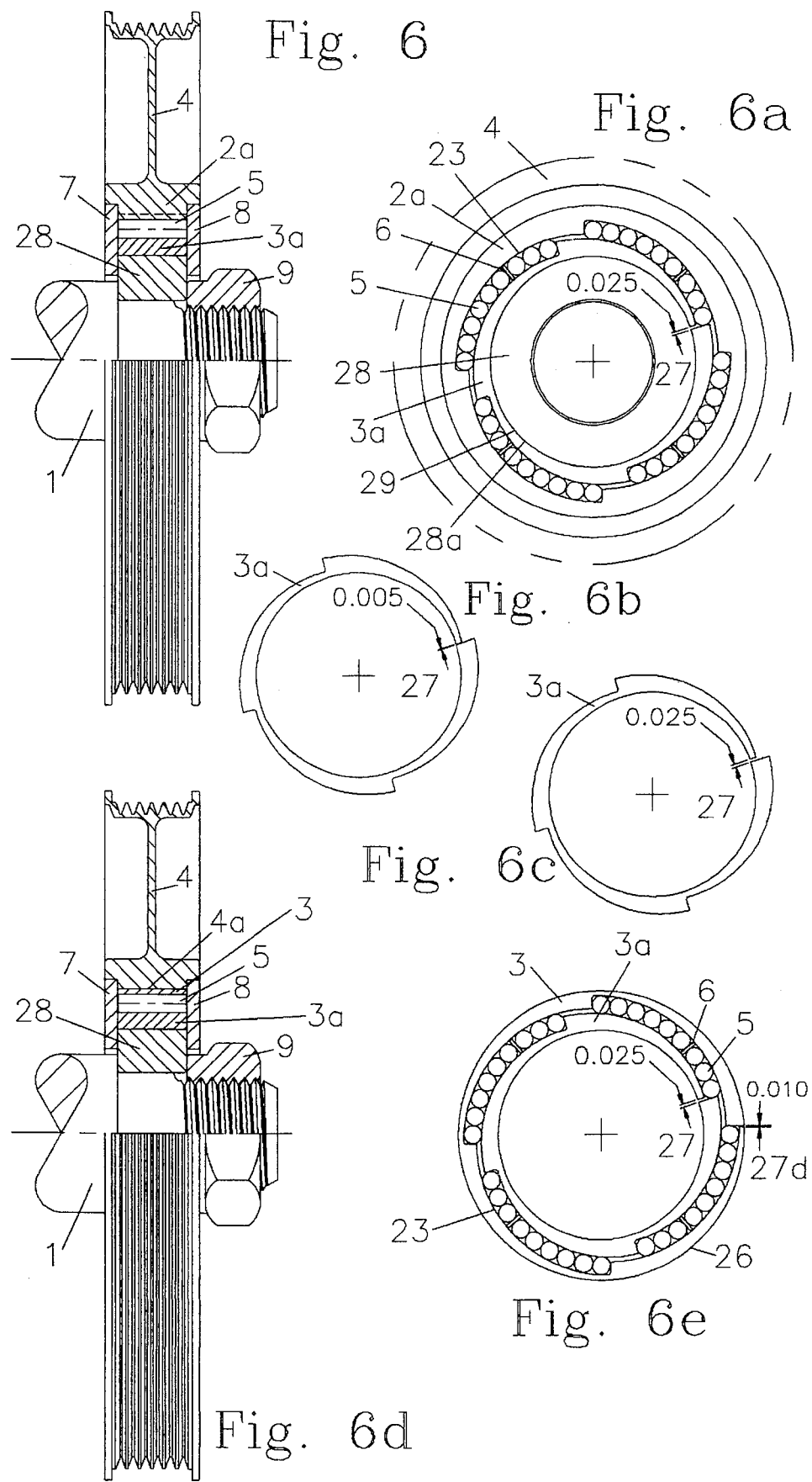

Fig. 7a
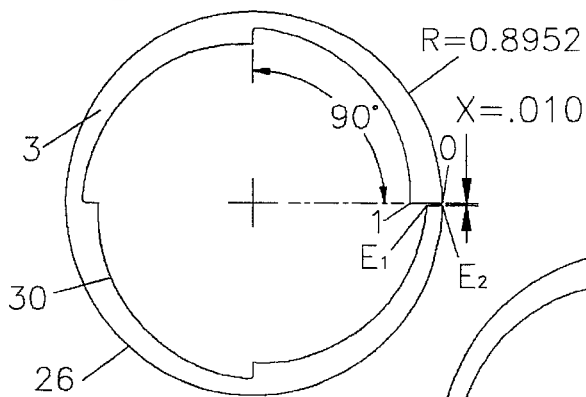
Fig. 7b
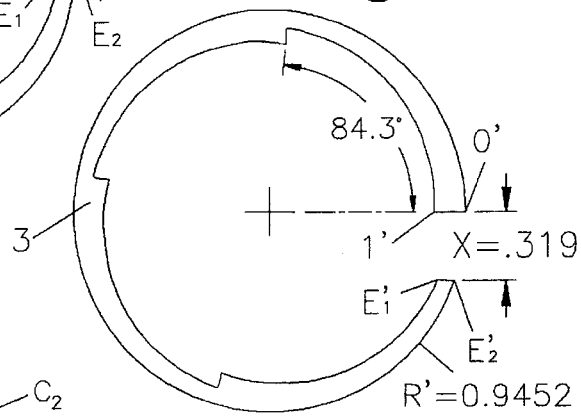
Fig. 7c
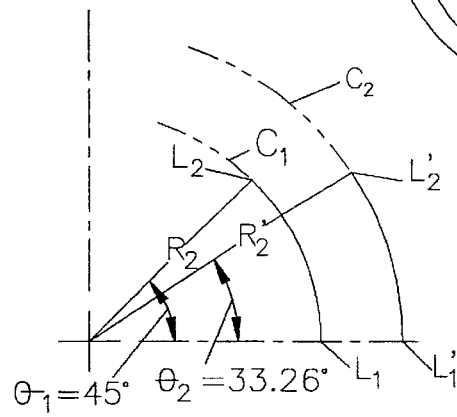
Fig. 7d
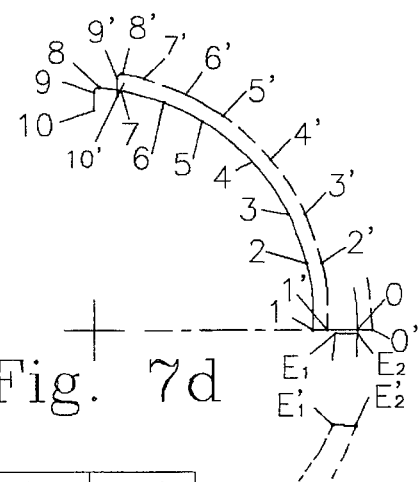
Fig. 7e
| P# | R | $\theta°$ | P# | R' | $\theta°'$ |
|---|---|---|---|---|---|
| 10 | 0.741 | 90.0° | 10' | 0.791 | 84.3° |
| 9 | 0.801 | 90.0° | 9' | 0.851 | 84.7° |
| 8 | 0.818 | 88.7° | 8' | 0.868 | 83.6° |
| 7 | 0.813 | 83.5° | 7' | 0.863 | 78.7° |
| 6 | 0.804 | 72.8° | 6' | 0.853 | 68.5° |
| 5 | 0.795 | 62.5° | 5' | 0.845 | 58.8° |
| 4 | 0.781 | 46.7° | 4' | 0.831 | 43.9° |
| 3 | 0.767 | 30.4° | 3' | 0.817 | 28.5° |
| 2 | 0.756 | 17.4° | 2' | 0.806 | 16.4° |
| 1 | 0.741 | 0.0° | 1' | 0.791 | 0.0° |
| $E_1$ | 0.818 | 359.2° | $E'_1$ | 0.868 | 338.5° |
| $E_2$ | 0.895 | 359.3° | $E'_2$ | 0.945 | 340.2° |

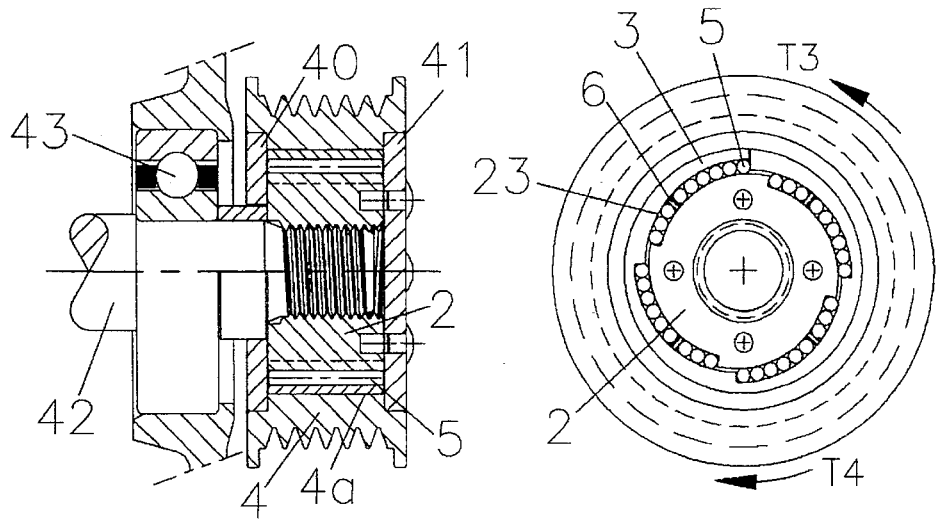
Fig. 8a    Fig. 8b
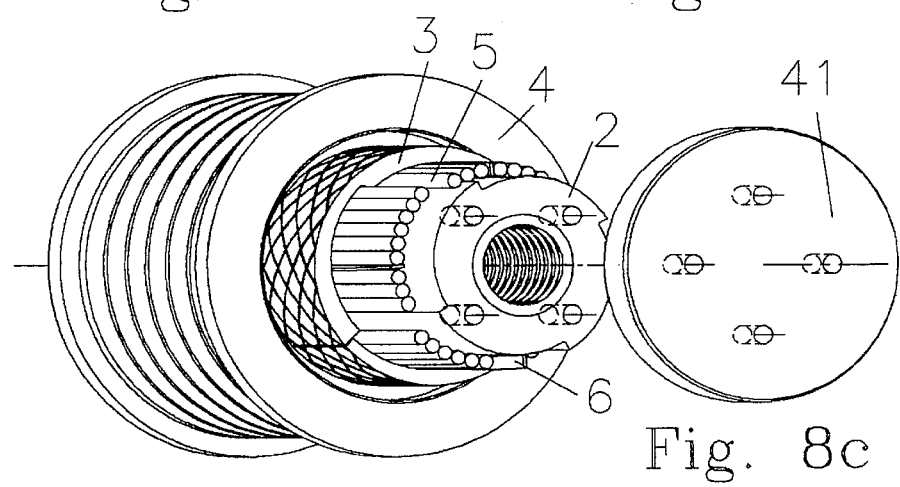
Fig. 8c
Fig. 8d
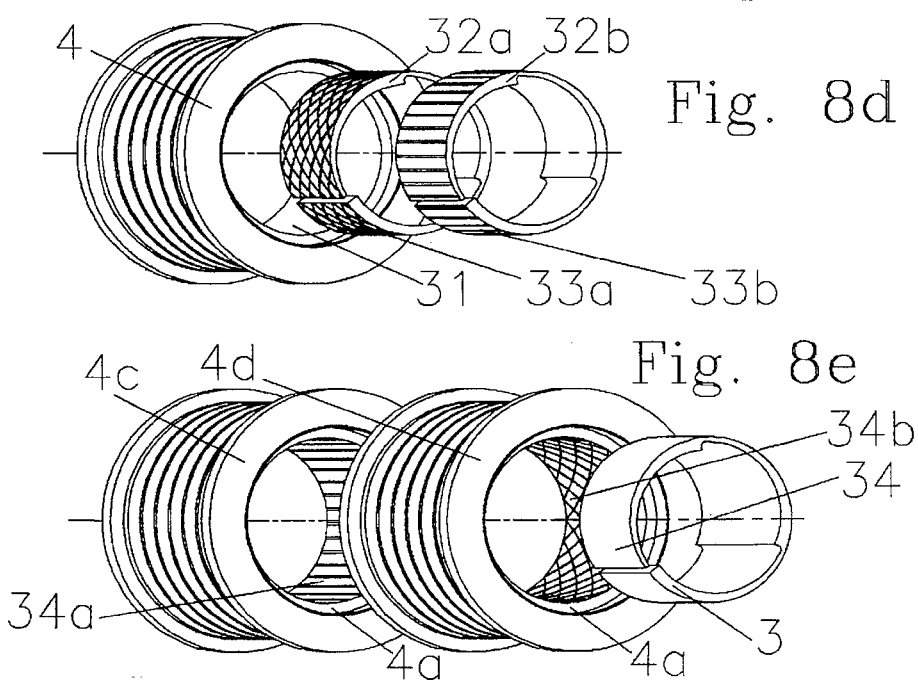
Fig. 8e

AUTOMOTIVE ACCESSORY DRIVE PULLEYS INCORPORATING SPIRAL TYPE ONE-WAY CLUTCH

FIELD OF THE INVENTION

The present invention relates to the application of one-way clutches to automotive accessory drives in general, but more specifically to serpentine "flat belt" drives with belt tensioners that are particularly suited for use of a high indexing rate, over-running clutch. It further relates to spiral type one-way clutches of an improved, high indexing rate design.

DESCRIPTION OF THE PRIOR ART

Accessory drive pulleys on internal combustion engines generally incorporate a belt shive and a hub section for attachment to either an engine crankshaft extension or to a driven spindle of an accessory. As such, the accessories are subject to both the low speed oscillations of the engine and to any sudden engine decelerations as up-shifts of the vehicle transmission takes place. When a sudden deceleration of the engine occurs, the alternator and other accessories resist slowing down due to their rotational inertia. This produces, on occasion, a loud "squeal" from the belt-pulley interface. Apart from stress on the belt, this effect is disconcerting to drivers. The remedy in the past has been to raise the tension in the belt, at the cost of increased belt wear.

A further reason why accessory belts are commonly operated at high tension levels is that the rotational output of the crankshaft spindle of an internal combustion engine inherently operates with pulsations or oscillations in its rotational velocity. The consequence for the belt is that its tension level fluctuates above and below a base level. To ensure proper engagement of the belt to the accessory pulley(s), the belt tension is raised above the level at which the tension variations may cause slippage. Thus the presence of an oscillatory component in the belt drive exposes conventional belt systems to an increased stress.

A need exists to provide a means by which the coupling of such oscillations to accessories is reduced or minimized.

A need also exists for an arrangement which will reduce or eliminate the anxiety-causing "belt squeal" that arises from sudden down shifts in engine speed.

It is a premise and object of the invention hereafter described that such need may be addressed by the use of a one-way clutch positioned in the rotary linkages between the main engine crank shaft and the various accessories being driven therefrom. Preferably, such clutch should be of a high indexing rate design in order to best address the problem of belt tension oscillations.

A high indexing rate type of one-way clutch incorporated in the hub of an accessory drive pulley will achieve two results. First, it will isolate the driven components from the slow-speed high frequency torsional oscillations of the engine, and secondly, it will allow the driven components of the system to disengage from the engine continuum as deceleration takes place during an up-shift of the transmission.

A particular advantage of using these over-running pulleys in an accessory drive system is that by suppressing belt vibration during slow speed engine operation, the need to tighten the belt to a high tension level is reduced. Even if belt tension is not reduced, "belt squeal" arising from belt slippage during rapid decelerations of the engine is eliminated by introducing a one-way clutch into the couplings of an accessory drive system.

One design for a one-way clutch that will serve in this role is preferably provided by a spiral type one-way clutch with features that enhance both its' indexing capability and its' ability to free-wheel under high radial loadings. An object of this invention is, therefore, to provide such a clutch.

Early references to spiral clutch designs include U.S. Pat. No. 2,785,782 to Adiel Y. Dodge and U.S. Pat. No. 3,021,925 to William B. Osborne. A more recent form of one-way clutch to the same inventor as for the present invention that provides an improved indexing rate capacity is that described in the following patents: Canadian Pat. 1,115,221- SPIRAL TYPE ONE-WAY CLUTCH U.S. Pat. No. 4,351, 294-SPIRAL TYPE ONE-WAY CLUTCH ASSEMBLY This prior art spiral clutch configuration relies on two spiral surfaces to form a spiral channel for roller bearings. The spacing between the spiralled sidewalls of this channel is substantially constant for a given range of rotational orientation of the two elements defining its side walls. Differential motion of the components carrying the spiral surfaces—a split slipper and a body element—causes one of these spiral surface-carrying components, the split slipper, to expand (or contract if the body and split slipper are interchanged) and engage with a bearing surface, or slipper race, positioned externally (or internally) to the spiral channel.

In one variant, an outer, encircling race-carry element must be present to contain the expansion of the split slipper and provide a torque flow-through path when the clutch is rotating in engaged or "locked-up" mode. In another version of this prior art spiral clutch, the body that, together with the slipper, defines the spiral channel is located on the outside, and the split slipper contracts to engage an inner race which may be carried by a shaft to be turned.

This configuration provides an even distribution of compressional forces, and resulting stresses, on the roller bearings contained within the spiral channel. Further, the frictional engagement that occurs when the clutch engages is borne by essentially cylindrical bearing surfaces that meet at the interface between the split slipper and slipper race and function as a journal bearing.

Additionally, the roller bearings used in spiral-type clutches reduce the frictional resistance to the differential rotation of the spiral side surfaces of the spiralled race when it is intended for the clutch to engage or disengage. This reduces the effort to "make" or "break" the engagement of the clutch. Cylindrical roller bearings are preferred over ball bearings for use within the spiral race because the line contact they provide distributes the stresses that arise over a larger contact region. Nevertheless, such a clutch could operate with roller ball bearings in the race and both variants are intended to be included as a "bearing" within this disclosure.

A small biasing drag should be present when such a clutch is in its open or free-wheeling state. This drag is required so that, when the clutch is operated in the opposite, lock-up direction, sufficient differential rotation of the spiral surfaces will occur in order to effect engagement of the clutch. This drag must be sufficient to overcome the starting friction of the rollers within the spiral race.

It is proposed in U.S. Pat. No. 4,341,294 to provide a spring, positioned to extend between both spiral surface-carrying components that define the spiralled channel—the body and the slipper, so as to bias the rotation of these components towards engagement of the clutch. The pressure of the spring is ideally just sufficient to ensure that enough drag exists between the respective components carrying the spiralled walls defining the spiral channel that, upon rotation of the clutch for engagement, differential motion between such walls will occur. This differential motion develops the radial displacement of the split slipper and generates the force needed for the clutch to become positively engaged.

The appropriate force generated by this biasing spring should be sufficient to produce enough drag on the slipper surface of the clutch to ensure reliable engagement. At the same time, no more than the minimum necessary degree of drag is desirable in order to avoid wear on the slipper and the wasted consumption of energy during free-wheeling.

U.S. Pat. No. 4,341,294 proposes the use of either a reversely bent, "U"-shaped spring or a transversely mounted helical spring abutting between the body and slipper elements, in each of the spiral segments of the clutch assembly. In either case, these spring elements were required to accomplish two tasks:

a) to provide the initial frictional force between the slipper and its race that is essential for clutch engagement; and b) to limit the relative rotational positions of the slipper and body elements when the clutch is free-wheeling in order to have such parts positioned for rapid engagement when the clutch enters lock up mode.

Task a) requires a spring with a high stiffness to provide the initial coupling forces (but not an excessive, drag-creating force) needed to expand the slipper against the slipper race and effect clutch engagement. Task b) requires a spring with a positive compressive limit to minimize backlash and sufficient travel to reposition the body and slipper for rapid re-engagement, while having a low stiffness to minimize free-wheeling drag.

While the "U"-shaped springs of the cited patent(s) provide a built-in positive stop, the spring rate must be compromised to meet the two assigned tasks. In addition to not having a positive stop, a transversely mounted helical spring, as described in the above reference, also requires a similar compromise. It is, therefore, an object of the invention to provide a spiral, one-way clutch that addresses both of these tasks in a novel manner to provide a spiral-type, one-way clutch with embodiments that enhance its high speed indexing capability without compromising its ability to free-wheel under high radial loadings. It is a further object of the invention to incorporate such improved, spiral-type, one-way clutches between the pulley shive and spindles of one or more automotive accessory drive pulleys.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to a broad aspect of the invention, an internal combustion engine having an accessory belt drive is provided within the rotational couplings of such drive with one or more one-way or overrunning clutches. Such clutches decouple the driven accessory substantially from the reversing portion of oscillations in the rotational velocity of the engine and particularly from rapid decelerations of the engine. The alternator present in typical accessory drive systems is an ideal application for this invention.

A one-way clutch may be incorporated into the pulley mounted on the spindle of the main engine crankshaft or other power take-off point on the engine. Such clutch may also be located in the pulley connected to the accessory being driven. Accessories contemplated in this regard include, as well as an alternator, an exhaust system air pump, air conditioner compressor and other typical driven components.

According to a further aspect of the invention, a preferred form of one-way clutch suited for incorporation into an accessory drive system is a one-way clutch of the spiral type having a substantially cylindrical slipper bearing surface which functions similarly to a journal bearing.

A preferred form of spiral one-way clutch, according to the invention, is one which has a high indexing rate, incorporating features addressing the two tasks assigned to the biasing spring element present in known spiral type, one-way clutch designs.

Two embodiments for a spiral type, one-way clutch assembly are disclosed that address the need for comprise between the tasks as referenced above. Task a) is accomplished, at least in part, by providing a split slipper element which is pre-loaded to provide expansion forces of relatively high stiffness that are generated when the split slipper is compressed or imploded to fit, with an interference fit, within an encircling outer slipper race or bearing surface. (An alternate configuration provides for the split slipper to be biased to contract against an inner, contained, slipper race or bearing surface for engagement with a contained shaft).

Task b) is accomplished by substantially filling each spiralled channel with roller bearings and providing at least one low stiffness spring means, e.g. a leaf spring, that is positioned within the race, preferably between two cylindrical roller elements in each spiral segment of the assembly. Such a spring means provides a positive limit to differential slipper/body movement when compressed to a flat state during transition from engaged to free-wheeling mode. It further re-advances and positions the body and the slipper to be ready for re-engagement with minimal lost motion when the clutch reverts to rotation in the engaged direction. Additional, it serves to maintain the cylindrical roller bearings in parallel alignment and accommodates small variations in the tolerances for roller diameters and the length of each spiralled segment. Lastly, it provides a supplementary or alternative source for biasing the differential rotation of the sides of the spiral channel to create the drag needed to ensure that positive engagement of the clutch will occur.

While the leaf spring feature relies upon the inclusion of a distinct element within the clutch assembly, the preloaded split slipper embodiment relies upon the production of a split slipper element that is of a precisely manufactured shape. One means of effecting manufacture of the split slipper is to produce it in a free-state of expansion with a precise shape that will, when imploded (or expanded), fit into a slipper bearing with the spiralled surfaces of the split slipper being reshaped upon compression to exactly form the spiral channel sectors of the clutch assembly and the slipper cylindrical surface that functions as a journal bearing. Such a production exercise can require that parts be shaped to high tolerances, on the order of 0.0001 of an inch (0.00254 mm). A method by which this can be achieved is described below.

In the fabrication of the split slipper element, particularly when sintered metal technology is employed, the cross-sectional thickness of the slipper may be so great that the elastic characteristics of the slipper element upon compression are excessively stiff. In such a case, the slipper element may not have the necessary elastic expansion range of travel to operate with minimal drag when in over-running mode.

Alternately, if operated with minimal drag the stiffness of the slipper element may resist inducing the differential rotation of the slipper and body components needed to precipitate engagement of the clutch.

In such cases it may be desirable to combine the use of an elastically-compacted slipper ring with the use of supplemental spring members positioned to bias the slipper and body for differential rotation. Such supplemental spring members are preferably contained in the spiral channel along with the roller bearings. Alternately, such springs means may serve as the principle means to bias the clutch towards engagement when rotating in the lock-up direction.

In either case the spring means presses against the roller bearings to bias the split slipper to expand and press its outer slipper bearing surface against the inner race of the containment member whereby sufficient drag is developed between the race and inner slipper bearing surface to precipitate differential rotation of the body with respect to the slipper element in a direction that will effect expansion of the slipper and engagement of the clutch.

Preferably, such spring means is of a leaf-type form and at least one spring means is positioned between two roller bearings within each spiral race within the bearing. Alternately, the spring means may be positioned at either end of the spiral channel.

Either a single spring element may be employed, or multiple spring elements may be inserted in the race. While not essential when serving as "limit cushion", when the spring means is utilized to precipitate engagement of the clutch it is preferable that the combination of the roller bearings and spring means together substantially fill the spiral race while the clutch is in over-running mode in order to allow the force of the spring means to operate through the consecutive roller bearings to bias the body and slipper towards re-engagement. In such an arrangement, the biasing force between the slipper and body elements is transmitted through the roller bearings and spring means contained in the spiral channel.

The spiral one-way clutches that comprise the present invention are ideally suited for use in the accessory pulleys of belt-driven automotive engine accessory units. Spiral clutches are convenient for the automotive accessory application because of their reduced size. Sprag, roller ramp, or other known types of one-way clutches all require added cages and/or alignment bearings to maintain the integrity of the jamming elements. This is not so with spiral type one-way clutches since their overrunning surfaces serve as a journal bearing when free-wheeling. It is this feature that allows a spiral-type over-running clutch to be fitted conveniently into the pulley of any driven automotive accessory and to carry the high radial loads present in such applications.

Nevertheless, it is possible to provide other designs of one-way clutches in automotive accessory drive linkages and achieve useful results, such as reducing belt squeal. While not limiting the use of one-way clutches in this application to those of spiral design, a possible prior art design of over-running clutch suited to use in the accessory drive application is that described in U.S. Pat. No. 4,351,294.

Another feature of the spiral clutch of the invention is the inclusion of lubricating grooves on either a slipper bearing surface or an opposed race (or both) to assist in their task of operating as a journal bearing. This is particularly important in accessory drive application where these interfaces are subject to very high axial loads. The preferred configuration to be provided with such grooves is one wherein the slipper rotates within an exterior race carried by a containment member. In such case, when over-running mode is entered centrifugal force will cause the lubricant to flow into the interface defined between the two cylindrical surfaces of the containment member and the slipper.

A spiral one-way clutch according to the invention has a high indexing capability, on the order of 60–70 Hz and higher depending on the precision of manufacture. This allows the clutch to operate in the range required to isolate the driven accessories from the torsional oscillations of a engine crankshaft for even an eight cylinder engine when rotating at speeds of up to 1500 rpm. This oscillation isolation capacity is an order of magnitude some six to ten times higher than that of most, if not all other known types of one-way clutches. It also covers the range where such oscillations are more severe.

The foregoing summarizes the principal features of the invention and some of its optional aspects. The invention may be further understood by the description of the preferred embodiments, in conjunction with the drawings, which now follow.

SUMMARY OF THE INVENTION

FIG. 1 is a layout of a typical automotive belt driven accessory drive system.

FIG. 2 graphically depicts in a highly schematic form the change in amplitude of the torsional oscillations on a prior art crankshaft accessory drive pulley for an eight cylinder engine when rotating at speeds of 500, 800 and 1500 rpm.

FIG. 5 shows a split cross-sectional side view of a crankshaft accessory drive pulley with a spiral type one-way clutch according to the invention incorporated between the pulley hub and the crankshaft.

FIGS. 5a, 5b and 5c show in plan view the three kinematic dispositions of state of the four basic elements of a spiral type one-way clutch assembly similar to FIG. 5 when:

(a) free-wheeling;

(b) kinematically static or relaxed; and (c) fully torqued.

FIG. 5d and 5e show the permitted shape of the corners on the slipper and body that define the ends of the spiral channels.

FIG. 5f, 5g and 5h show FIGS. 5a, 5b and 5c without the presence of spring means in the spiral channel.

FIG. 6 shows a split cross-sectional side view of a pulley incorporating a spiral one-way clutch designed to engage in a reverse manner to that of FIG. 5 with an inner shaft through a race-carrying bushing clamped to such shaft.

FIG. 6a, is a partial plan view of the slipper of FIG. 6 fitted with roller bearings.

FIGS. 6b and 6c depict the slipper (only) of FIG. 6 when compressed and when expanded.

FIG. 6d shows a split cross-sectional side view of a pulley incorporating a spiral one-way clutch designed with dual split slippers.

FIG. 6e is a plan view of the slipper and outer body of the clutch of FIG. 6d, with rollers within the spiral channel and the dual slippers operating in a free-wheeling state.

FIGS. 7a and 7b show embodiments of a slipper respectively when the outer cylindrical slipper bearing surface is restrained by the inner race of the containment member and when such slipper unrestrained in an expanded free-state.

FIGS. 7c and 7d illustrate the method used to transpose points on the surface of a slipper element when restrained by a first, circular containment cylinder into a corresponding surface with the slipper element in a free state of expansion.

FIG. 7e is a table showing the corresponding values for the locii of points in FIG. 7.

FIG. 8a is a cross-sectional side view of a spiral one-way clutch assembly within a pulley mounted on the threaded shaft of an alternator.

FIG. 8b is a plan view of the body and slipper within the pulley of FIG. 8a.

FIG. 8c is an exploded perspective view of an alternator pulley having an inner threaded body for engagement with a threaded alternator shaft and having a knurled slipper bearing surface.

FIG. 8d shows a perspective view of an alternator pulley sheave with two alternate versions of cylindrical, grooved slipper bearing surfaces bearing cross-hatching and parallel grooves respectively.

FIG. 8e shows two alternate pulley sheaves with inner, cylindrical, knurled and grooved slipper bearing surfaces respectively.

DESCRIPTION OF THE PREFERRED EMBODIMENT

Figure 1:
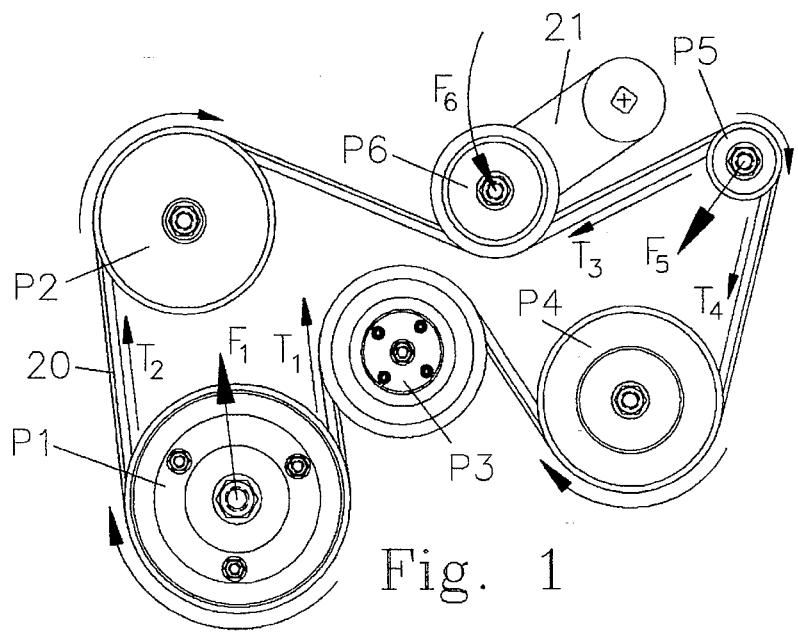

FIG. 1 depicts the layout of a typical automotive, belt driven, accessory drive system that consists of an engine driven crankshaft pulley P1 and three driven pulleys P2, P3 and P4. These latter pulleys may be used to drive, for example, the following accessories: an engine water pump, a catalytic converter air pump, an air conditioner compressor, a radiator cooling fan, or a power steering pump. Additionally, FIG. 1 depicts an alternator pulley P5 and a free belt tensioner pulley P6 for tensioning the belt 20. Depicted by arrows are the belt tension loads T1, T2, T3 and T4 that result from torsional force F6 applied through the spindle of the free pulley P6 of the belt tensioner 21 to the belt 20; and from the torque loads of the accessories that together develop radial forces F1 and F5 on the crankshaft and alternator spindle.

In many serpentine "flat belt" drives the tension loads attributable to a tensioner is in excess of 100 pounds. When this background stress is added to the driving and inertial torques developed at an accessory pulley the combined effects can give rise to forces F1 and F5 that are as high as 350 pounds. This places severe demands both on the belt 20 and on the spindle bearings of the accessories (not shown in FIG. 1).

Figure 2:
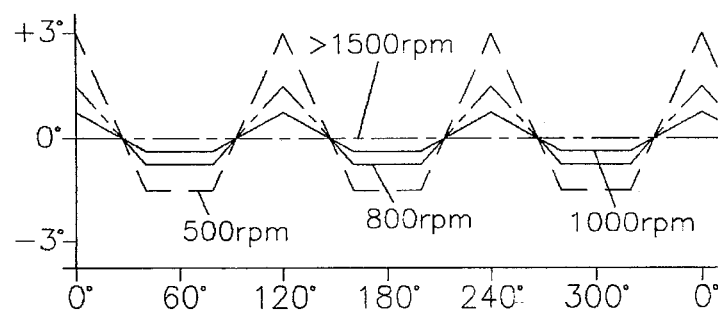

The belt tension developed by the belt tensioner 21 is generally kept high due to the variations in belt tension arising from pulsations in the power developed within the engine. FIG. 2 provides a series of symbolic, graphical curves illustrating the changing amplitudes in the rotational oscillations of a crankshaft accessory drive pulley for an eight cylinder engine when rotating at speeds of 500, 800 and 1500 rpm. The zero degree line in FIG. 2 represents the average position of the crankshaft pulley P1, rotating at crankshaft rotational velocity. It will be seen from FIG. 2 that the oscillations in the engine speed are more severe at lower rpms, reducing when engine speed exceeds 1000 rpm. As depicted, there are four cyclical periods of oscillation during each revolution of the crankshaft that essentially correspond to the firing strokes of the engine. The curves of FIG. 2 are not intended to reflect sinusoidal or symmetrically even responses, FIG. 2 being merely a schematic depiction to show the cyclic pattern of the variations in crankshaft speed. The curves generally represent the excursion in rotational displacement of this pulley P, about the position defined by the average velocity position which is taken as the zero reference.

It is a premise of this invention that the wearing effects of such oscillations on the engine belt and pulleys P1–P6 can be reduced by introducing a one-way clutch function into the hubs of one or more of the rotating members. Accordingly, an accessory drive one-way clutch which addresses the objective of smoothing such pulsations may be required to effect indexing at a rate up to or better than the frequency periods of an eight cylinder engine, which is approximately 67 Hz with the engine rotating at 1000 rpm.

Referring to FIG. 1, when rotating at a steady-state or when accelerating, the difference in the tensions T2 and T1 on pulley P1 is approximately equal to the functional and inertial load torques of the accessories. When decelerating, the difference is approximately equal to the functional load torques minus the inertial load torques. As a consequence, when engine torsional oscillations are as shown in FIG. 2, the accessory drive belt and in particular the tension will oscillate in sympathy with the changing tensions on the belt. As rapid engine decelerations occur, a belt surrounding the pulley shive of an accessory with a high inertia will tend to loosen as a consequence of inertial load torque reversal. This can result in a slipping belt with accompanying "belt squeal", especially in the case of an alternator pulley because of the large armature mass and speed of rotation of this component. This speed of an alternator is typically three or more times that of the engine due to the ratio of diameters of the crankshaft and alternator pulleys.

Figure 3:
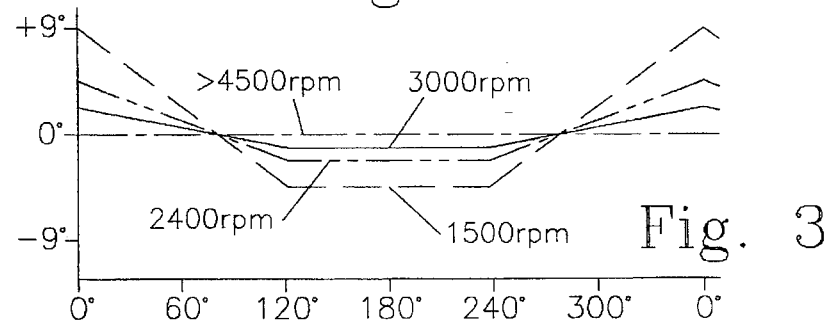
FIG. 3 depicts a series of schematic graphical curves showing the resulting torsional oscillations on an existing alternator pulley with rotation three times that of the engine when driven by a belt from a crankshaft rotating in accordance with the graphs of FIG. 2.

FIG. 3 shows graphical curves for the translation of the resulting rotational oscillations developed by a crankshaft pulley as depicted in FIG. 2 to a driven alternator pulley which is rotating at three times the speeds of the engine.

The nature of an alternator is such that its rotating armature is of a high mass, with a trend to ever increasing masses as more electric power is being demanded during and following engine start-up. To be effective at the lower speed range of a modern engine alternators generally rotate at speeds some three times that of the engine. Therefore, alternators are subject to a speed range that varies from approximately 1500 up to 24000 rpm. Since inertia is a product of mass and velocity, whether linear or rotary, it is quite understandable why belt squeal can arise on engine downshift. An alternator pulley with a one-way clutch incorporated between its shive and spindle will do much to eliminate such effects of inertial torque reversals as arise in an automotive accessory drive system.

Figure 3A:
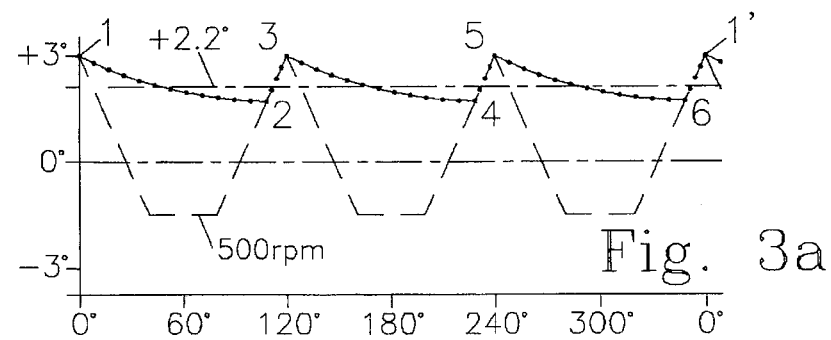
FIG. 3a is a graph which shows the anticipated rotational displacement of the shive section of a crankshaft pulley according to the invention, as shown in FIG. 5, with abated excursions of amplitude and a slightly biased average rotational velocity above that of the crankshaft, for the 500 rpm graphic curve of FIG. 2.

FIG. 3a is a graphic display of the results of incorporating an over-running clutch into the crankshaft pulley of an accessory drive system. The broken line is a reproduction of the 500 rpm curve from FIG. 2. The solid, beaded line shows the result of incorporating a one-way clutch of high indexing capacity into the pulley. As can be seen, reverse pulsations are eliminated in FIG. 2. And the magnitude of positive pulsations at 500 rpm are reduced. The pulsations above 750 rpm are virtually eliminated. The horizontal broken line at +2.2° in FIG. 3a represents the mean of the rotational position of the pulley P1, which position is slightly advanced over the prior zero-reference position for the pulley when coupled to the crankshaft.

Figure 4:
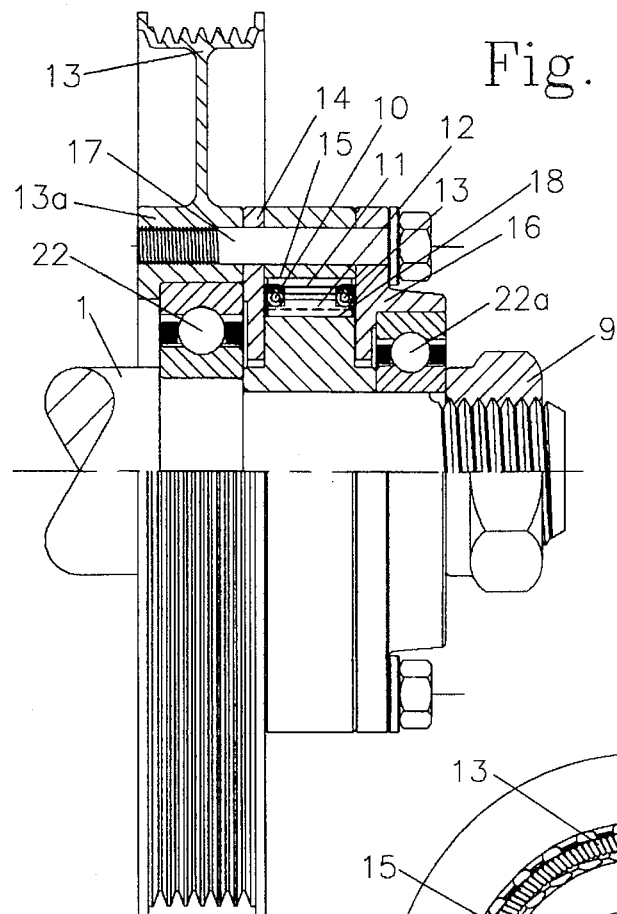
FIG. 4 is a split cross-sectional side view of a crankshaft mounted pulley with a sprag type of one-way clutch incorporated therein.

FIG. 4 is a sectional view of the structure of a crankshaft mounted with an accessory drive pulley having a sprag-type overrunning clutch assembly fitted between the hub 13a of the pulley shire 13 and an extension to the crankshaft 1. Held fixed against a shoulder of the crankshaft 1 by a retaining nut 9, are the sprag clutch bearings 22 and 22a, together with an inner race 18 of the clutch assembly. Held fixed between the pulley hub 13a and side plates 14, 16 by a through bolt 17, are the bearings 22 and 22a, and the outer race 15 of the clutch assembly. Positioned between the outer and inner races 15 and 18 of the clutch assembly, is the cage member that retains the sprags 12 and the sprag side torsional coil springs 10 and 13.

The essential structural requirements in this system are first, to maintain concentric rotation of the inner and outer races, which is a required feature of a sprag type overrunning clutch; and secondly, to provide an annular cavity surrounding the sprag assembly so that lubricating grease is retained in the structure when rotation takes place.

Figure 4A:
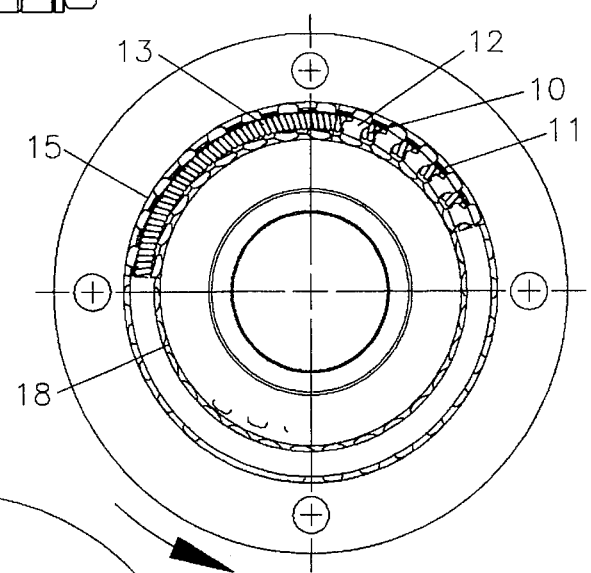
FIG. 4a is a plan cross-sectional view of a pulley having the sprag clutch design of FIG. 4 positioned therein.

FIG. 4a is a front sectional view of the sprag type overrunning clutch assembly of FIG. 4 that shows the sprag cage 11, and edge-slotted sprags 12 that accommodate coil springs 10 and 13. These springs 10, 13 impart a torsional twist to the sprags 12 to maintain them in contact with inner and outer races 15 and 18 of the assembly when the clutch is over-running.

Figure 4B:
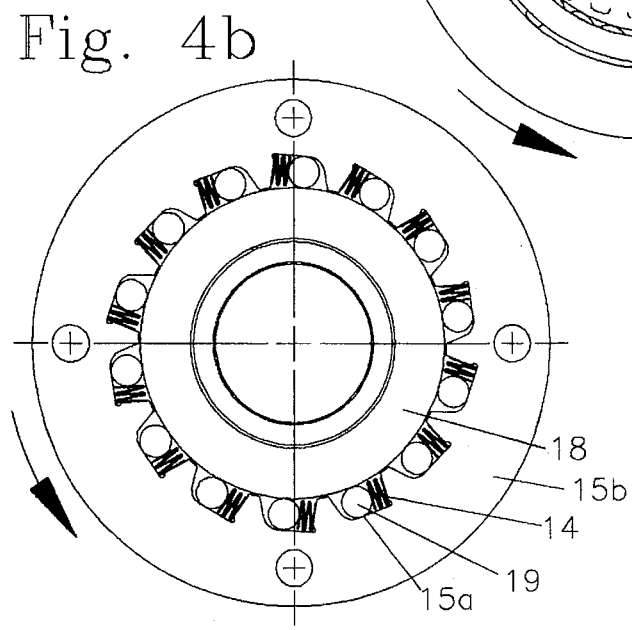
FIG. 4b is a schematic plan cross-sectional view of a pulley having a roller-ramp type one-way clutch contained therein.

As an alternate embodiment, FIG. 4b shows a front sectional view of a roller-ramp type of one-way clutch assembly with rollers 19 held in contact with an inner race 18 and a ramp surface 15a of an outer body member 15b. Roller bearings 19 are biased by compression spring 14 to bear against face 18 of the clutch assembly.

Both of these one-way clutch designs can be employed to achieve the "free-wheeling" function described above. While operable, such standard one-way mechanisms have a number of deficiencies.

Because the jamming elements in sprag and roller ramp types of one-way clutches as shown in FIGS. 4a and 4b are kinematically independent of each other, equal load sharing depends on the consistency in their array of contact as maintained by their respective coil or accordion springs. Transient acceleration in the plane of the axis of the assembly, as would be caused by torsional and/or radial vibrations of the accessory belt and/or engine, will tend to distort the array and cause an unequal load sharing through the jamming elements. While bearings, normally provided at each side of sprag and roller-ramp one-way clutches, maintain concentricity of their respective inner and outer races, there is little that can be done to prevent a disarray of the jamming elements when subjected to the vibrations of an automotive accessory drive system.

Consequently such devices are susceptible to deficiencies that make them less that ideal as the one-way mechanism for an accessory drive system. Additionally, they are incapable of responding to and damping the high frequency oscillations present in a belt drive system that make it necessary to impress high tensions on the belt and rotating pulleys.

This required frequency response is, however, within the capability of a spiral type one-way clutch, and particularly a spiral type one-way clutch as modified by the improvements hereafter described.

FIG. 5 depicts the essential structural embodiments of a crankshaft-mounted accessory drive pulley with a spiral type one-way clutch assembly positioned therein. Held fixed against a shoulder of the crankshaft extension by a retaining nut 9 is a body element 2 of the clutch assembly. Rotatable held congruent with an inner race 4a in the pulley shive 4 and between annular side plates 7 and 8 is a split slipper element 3. Roller elements 5 contained in a spiral channel 23 are in contact with both the body 2 and slipper 3. Not seen in FIG. 5, but presented in FIGS. 5a, 5b and 5c are leaf spring elements 6 which extend between the side plates 7, 8 and are abutting two adjacent rollers 5 within the spiral channel 23.

FIGS. 8a and 8b show a similar clutch assembly which has been attached to a threaded shaft extension 42 as typically found on alternators.

FIGS. 5a, 5b and 5c show the kinematic disposition of the four basic elements of the improved spiral type one-way clutch when:

(1) free-wheeling;
(2) static (i.e.: no relative movement or tendency for movement between the elements—This is also an instantaneous transitional state); and
(3) when fully torqued.

Laterally placed depictions of the leaf spring 6a, 6b, 6c shown in associated with FIGS. 5a, 5b and 5c respectively indicate the degree of compression in the leaf springs 6 while in each respective kinematic state. Locii $a_1$ and $a_2$ are a measure of the distance extending between the centres of the end rollers 5a, 5b including the arc of compression (if present) of leaf spring 6, for each of the sectors of the clutch assembly. T1 and T2 mark the respective points of contact where the end rollers 5a, 5b of a sector touch the radial faces 24, 25 of the slipper 3 and body 2 element that define the limits of the spiral channel 23. The end rollers 5a, 5b are, in a preferred variant of the invention, in contact with the radial faces 24, 25 when the invention is in over-running mode. Angles 14° and 4° are exaggerated measures of the range of rotation or backlash occurring between slipper 3 and body 2, with the change in the gap 27 formed in the circumference of the split slipper 3 having by the values 0.8x, x and 3x for the cases of gaps 27a, 27b, 27c of FIGS. 5a, 5b and 5c respectively.

The backlash depicted in FIGS. 5a, 5b and 5c is highly exaggerated to more vividly show the relative disposition of the four functional elements of a spiral type one-way clutch. As witnessed during actual tests of similar assemblies, in practice, rarely is backlash greater than 1.5° as measured from a free-wheeling to a fully torqued state.

To provide a clutch with a high oscillatory rate of performance it is necessary to eliminate as much lost motion between overrunning and locked modes as possible. One way this result can be achieved is by the inclusion of spring means, preferably leaf springs 6, within the spiral channel 23 of the clutch.

When the clutch assembly is in a static state as in FIG. 5b, the clockwise spacing between the radial surfaces 24, 25 of the slipper 3 and body 2 is indicated by the arc $a_2$ being the arcuate distance extending between the two end rollers 5a, 5b and including the particular thickness or travel of arched leaf spring 6. In this state, the end rollers 5a, 5b abut against radial faces 24, 25 of the slipper 3 and body 2 and the spring 6 should be in a relaxed, curved state as shown by 6a.

When operating in free-wheeling mode as in FIG. 5a, the maximum clockwise overlap of the radial surfaces of the slipper 3 and body element 2 is indicated by the length of the arc $a_1$. Again this overlap is governed by the distance between the two end rollers 5a, 5b in the spiral channel and by the thickness of the flattened leaf spring 6, 6a. In this state, the end rollers 5a, 5b again abut against the radial faces 24, 25 at the point T1 and T2 respectively on a slipper 3 and body element 2, but it is to be noted that the flattened spring 6, 6a applies a rotational biasing force between the slipper 3 and body 2, through the string of rollers 5.

When under torque as shown in FIG. 5c, maximum clockwise displacement of the radial surfaces 24, 25 of the slipper 3 and body 2 occurs. This is governed by the required expansion of the slipper 3 against a slipper race 4a (carried by the outer pulley 4 which acts as a containment member) needed to transfer the clutch into engaged mode. In this state, the length of arc $a_2$ remains at more or less the same length as when in a static state with a same arch in the leaf spring 6a, but with the end rollers 5a, 5b no longer abutted against radial faces 24, 25 of slipper 3 and body element 2.

The presence of the leaf spring 6 within the spiral channel 23 along with the rollers 5 that collectively fill such channel length during over-running mode operation, provide a definite limit to the relative rotations of the slipper 3 and body element 2. When the clutch assembly converts from a static to a free-wheeling state, the leaf spring 6 more or less collapses to a flattened or partially flattened shape. The change in the diameter of the slipper 3 when the clutch transfers from its over-running mode to its engaged mode closes the gap between the slipper bearing surface 26 and its containing member race 4a that otherwise provides a journal bearing interface. Accordingly, the arch of the leaf spring 6 when in a static mode, should be limited to only that necessary to establish a lubricating film between the journal surfaces 4a, 26 when free-wheeling. Lubricating film thickness theory suggests that a clearance of approximately 0.001 inch is all that is necessary for this purpose, and the required arch in the leaf spring 6 can be calculated by assuming a change in the diameter of the slipper 3 of approximately 0.002 inch.

Since by definition a diameter of every roller 5 is perpendicular to a spiral surface of both a slipper 3 and body element 2, the strut force along this diameter is dependent on the degree of contact between each roller 5 and the spiral surfaces as the kinematic disposition of the four basic elements changes during free-wheeling, static and fully torqued modes.

In the free-wheeling mode, strut forces are negligible, with the arc $a_1$ containing the roller elements 5 and leaf spring 6 being at a minimum as the applied force is limited to that exerted by the spring causing the two end rollers 5a, 5b in each sector to abut against the radial faces 24, 25 of the slipper 3 and body element 2.

In the fully torqued or locked mode, strut forces are at a maximum, with the arc $a_2$ containing the roller elements 5 and leaf spring 6 and the force exerted by the spring 6 unchanged from that of static mode. The result is that the two end rollers 5a, 5b in each spiral channel sector 23 may lose contact with the radial faces 24, 25 of the slipper 3 and body element 2 in such mode. Nevertheless, this arrangement provides a clutch device in which the roller elements 5 all share the applied loads equally, and lost motion is minimized. The result is a one-way clutch capable of responding at rates of oscillation on the order of 60–70 hertz, and possibly higher.

FIG. 5d shows the slipper 3 and body element 2 of the spiral type one-way clutch of FIG. 5 with their radial end surfaces 24, 25 having enlarged fillets r1 and r2, as shown in the FIG. 5e breakout of FIG. 5d. Such a shape for the ends of respective spiral surfaces defining the spiral channel 23 are permissible when the elements are manufactured by either "rollforming" or by "a sintered metal process" where sharp fillets tend to be irregular.

FIGS. 5f, 5g and 5h are respectively identical to FIGS. 5a, 5b and 5c, except for the absence of the leaf springs 6 shown in the former Figures. As shown in FIG. 5f, the free-wheel angle between the radial surfaces 24 and 25 of respectively the slipper and body elements, 3 and 2, is now 15° rather than 14° as shown in FIG. 5a. Also shown in FIG. 5g, when the assembly is in a kinematically static state the only the end roller 5a abuts against the radial face 24 of the slipper element, since the rollers 5 are relatively free in this state and centrifugal forces will tend to cause this effect. The intent here is to show that a spiral type one-way clutch that does not incorporate a leaf spring embodiment will also function. However, the rotation from a kinematically static state to a free-wheeling state is abrupt, and remains the same regardless of the speed at which free-wheeling takes place. Whereas, with the leaf spring 6 in place the amount of body-slipper movement is a function of speed and the duration of free-wheeling.

The use of spring means 6 present in a spiral channel not only serves to limit relative displacement and position the slipper 3 and body element 2, but also can serve to provide all or some biasing torque and "drag" needed to ensure precise engagement of a spiral clutch when entering engaged mode. Another alternate or supplementary means to create such drag may also be employed. That alternate means is provided by forming the split slipper ring 3 of a spiral clutch so that it must be elastically displaced (compressed or expanded) when it is fitted to its race, thereby creating an interference fit. The elastic condition so created will cause the split slipper 3 to tend to expand or contract against its race and thereby create the requisite drag.

FIG. 6 shows a partial sectional side view of an accessory drive pulley that incorporates an inwardly acting spiral type one-way clutch. A body element 2a affixed to the pulley shive 4, contains a slipper 3a with inner slipper bearing surface 28a congruent with an outer cylindrical surface of an outwardly directed slipper race 29 carried by a bushing 28 which is affixed to an engine crankshaft extension 1 by the compression of nut 9. The remaining elements of the assembly are described in the discussion of FIG. 5.

FIG. 6a is a plan view of the elements of the spiral type one-way clutch of FIG. 6, with all parts correspondingly identified.

FIG. 6b and 6c show respectively plan views of the slipper element 3a of FIG. 6 when free and relaxed, and when elastically expanded to encircle bushing 28 which carries the slipper race.

In this "inwardly directed" variant, the body 2a which defines part of the spiral channel 23 is mounted outwardly of the split slipper 3a serving as an external containment against expansion. Differential rotation between the outer body 2a and inner slipper 3a in the direction for clutch engagement causes the slipper 3a to contract against the race 29 provided by bushing 28. The principles for operation are otherwise analogous to those described for FIG. 5.

FIGS. 6b and 6c show the free-state and the expanded state of the inner slipper element of FIG. 6 and 6a, indicating that the end gap 27 of an expanded inner slipper is five times that of when it is in a freewheeling state (FIG. 6c). The slipper gap 26 over this transition ranges from 0.005 inches to 0.025 inches.

FIG. 6d shows a partial sectional side view of a crankshaft accessory drive pulley with a spiral type one-way clutch that contains both an outer slipper element 3, positioned within an inwardly directed slipper race 4a as in FIG. 5; together with an inner slipper 3a, and outwardly directed slipper race 29, as in FIG. 6. Together these parts form a two-slipper, spiral type, one-way clutch assembly.

FIG. 6e shows a plan view of the assembled two slipper elements 3 and 3a of FIG. 6d with roller elements 5 and leaf springs 6 in place. The spiral channel 26 is effectively composed of the outer slipper elements 3 of FIG. 5 and the inner slipper element 3a of FIG. 6 so that a clockwise rotation of the inner slipper with the outer slipper held rotationally fixed causes the inner slipper 3a to collapse, and the outer slipper to expand. The end gaps 27 of the respective slipper elements of 0.025 and 0.010 inches are depicted as they would be when respectively imploded and expanded to fit against their congruent race elements 4a and 29 of the assembly.

In this dual slipper variant, each split slipper 3, 3a serves as the body which defines the spiral channel 23 in conjunction with the other slipper. Such a configuration provides the security of two bearing interfaces that can operate as journal bearing surfaces in over-running mode.

The use of a spring means 6 contained along with the rollers 5 within and filling the spiral channel 23 is a convenient means to provide biasing drag in this configuration. The use of elastically pre-loaded slipper elements 3, 3a is also conveniently suited for application in this configuration.

The next series of Figures address an accurate method for shaping a split slipper ring to provide this elastic biasing function.

FIG. 7b shows a slipper 3 of a spiral type one-way clutch while in a free-state of expansion. FIG. 7a shows the same slipper 3 after being imploded to fit in an elastically loaded state into a slipper race 4a of the crankshaft mounted accessory drive pulley of FIGS. 5 or 6d.

FIG. 7c is an illustration showing the method used to transpose a point on a circle of given radius to an equivalent point on a circle of greater radius such that the length of the arcs defined by their respective polar co-ordinates are equal. From FIG. 7c, the polar co-ordinates of point L2 on circle C1 above a reference point L1 are respectively a radial length R2, (which for this illustration has a value 1.70 units of length) and an angle 01, shown as 45°. Accordingly, the length of the arc L1–L2, is $2*1.70(pi)/(45°/360°=1.3352$ units of length, or more simply the circumference of circle C1 divided by eight, being the number of 45° sectors in a complete circle.

The amplitude Ø' of the polar co-ordinates of the point L2' on circle C2 with radius R2' (which again for this illustration has a value of 2.30 units of length) is found by first dividing the circumference of circle C2 by the length of the arc L1'–L2' (which by definition is equivalent in length to the arc L1–L2, or 1.3352 units of length) to obtain the number of such arcs as there are on a full circle C2. That value, when divided into 360°, provides an answer of 33.26° as being the amplitude of the polar co-ordinate of point L2'.

A general relationship between the amplitude O of the polar coordinates of a point P on a circle C1 with given radius R, to that of the amplitude Ø', of the polar co-ordinates of a point P' on a circle with greater radius R', when the arcs described by their respective polar co-ordinates are equal in length, is given by the following expression:

$$\emptyset'=360°/((2piR')/(2piR/N)) \quad (1)$$

wherein: O' is the amplitude of the polar co-ordinates of point P' on an enlarged circle C2 and radius R' is the modulus of the polar co-ordinate of point P', R is the modulus of the polar coordinate of point P on the small circle C1, and N is 360°/0, or more simply the number of arcs in a full circle of radius R. It follows that when a point on a circle is transposed to a circle of lesser radius, as would be the case for the inside slipper elements of FIGS. 6 and 6d, expression (1) becomes:

$$\emptyset'=360°/(2piR/N)/((2piR')) \quad (2)$$

where: again Ø' is the amplitude of the polar coordinate of point P' on a smaller circle C2 and radius R' is again the modulus of the polar co-ordinate of point P', R is the modulus of the polar co-ordinate of point P on the enlarged circle D1 and N is again 360°/Ø, or more simply the number of arcs in a full circle of radius R.

FIG. 7d shows the change in shape of the spiral surface 30 of slipper 3 that results when end points E1 and E2, and points numbered from 0 to 10 on the 90° sector of FIG. 7a are transposed to the 84.3° sector of FIG. 7b in accordance with the method described in the discussion of FIG. 7c. As an example, the amplitude O' of the end point E2' on the expanded outside circumference of the enlarged, exaggerated slipper of FIG. 7b when it expands from a radius of 0.8952 as shown in FIG. 7a to a radius of 0.9452 as shown in FIG. 7b, for a difference of 0.050, is from expression (1) provided as follows:

$$\emptyset=360°/2pi(0.945/(0.895/(360°/359.3°)))=340.2°$$

From this formula the locus of transposed points on the spiral slipper surface 30 between its two states can be calculated. FIG. 7e provides a chart for a series of ten points P, along the arc of the spiral slipper surface 30 for which transposed polar co-ordinates have been calculated for the transition between FIGS. 7a and 7b. Such points can be used to machine a slipper blank in its relaxed state. By experiment, the requisite degree of expansion (or contraction) to obtain the appropriate drag can be selected from blanks so machined.

Thus FIGS. 7c and 7d with the above methology together illustrate a simple method of transposing points on the surface of a slipper element when confined to that of a surface With the slipper element in a free or as-manufactured state. The described procedure takes no account, however, of the bending characteristics of a varying radial thickness of material between the inside spiral surface 30 and the outside cylindrical surface 26 of the slipper 3. Nor does it take into account the type and nature of the material used in the manufacturing process. While most slipper elements when manufactured by fine broaching of semi-hardened materials followed by surface nitriding, or by diamond broaching or wire electrical discharge machining (W-EDM) of fully hardened materials, require little if any alteration to expression (1), when slipper elements are sintered, slight alterations to expression (1) could help in the definition of the surface profiles of a free slipper element 3. The reason for this is that column strength limitations of the sintering mandrels of the jig fixtures used in sintered metal production impose a minimum radial thickness on the slipper 3 that is considerably greater than that used for slippers 3 produced by other manufacturing processes. A number of theoretical models can be used to alter expression (1) to get a better fit, but a practical way to determine the optimal parts shape is to use empirical data obtained by trial and error. In general such alterations effect only the amplitude and not the modulus of transposition.

The subtended angles 84.3° and 90° of the third quadrant spiral sector of the slipper element of FIG. 6a and 6b, and the change in end gap from 0.319 to 0.010 inches are a good indication of the exaggeration used to illustrate the method of transposing points from a fully imploded slipper element to the same slipper element when in a free-state. They have been obtained from the table of FIG. 7e, which is based on a radial difference of about 0.050 inch.

In the preferred applications of this embodiment, using steel split slippers of the appropriate thickness, the difference in the radii of an imploded and free-state slipper element need rarely exceed 0.005 inch for accessory drive sized spiral clutches. This is particularly true in the case where the slipper bearing surface 26 is formed on the outside of the slipper 3. In such cases, centrifugal forces also act to encourage slipper/slipper race contact.

When manufacturing limitations necessarily require that the slipper 3 be of a thickness that renders it relatively stiff in compression, the earlier method of creating drag, vis by inclusion of a spring means 6 in the spiral race 26, may be employed in conjunction with the elastic pre-loading of the imploded split-slipper 3 to produce the requisite drag.

Previously, the problem of high axial loads being present on the spindles of accessory drive pulleys has been identified. An advantage of the spiral-type one-way clutch, as can be seen in FIGS. 8c, 8d and 8e is that the overrunning surfaces of a spiral type one-way clutch become effectively a journal bearing when in a free-wheeling mode. Like all journal bearings, lubrication must be provided, preferably by lubricant-containing grooves formed on either the bearing surface of the slipper or on the cylindrical surface of the slipper race.

Because a pulley structure of the type of FIG. 5 should preferably be able to hold a reasonable life supply of lubricating grease, what grease as is present should always be available to the overrunning, journal bearing, surfaces of the assembly. For this reason a spiral type one-way clutch with an outwardly directed slipper 3 contained with an encircling slipper race 4a is preferably chosen. In such a case centrifugal force will tend to inject any lubricating grease between the overrunning slipper 3 and slipper race 4a.

FIG. 8d shows a slipper member of a spiral type one-way clutch assembly with overrunning cylindrical surfaces 31, 32a, 32b that are either plain, knurled or axially grooved for grease distribution.

To maximize quantity and retention of lubricating grease in the rotating structure, a lubricant containment cavity is created by inclusion of two skirt-like, annular members (7, 8 in FIG. 5 and 40, 41 in FIG. 8a) affixed at each side of a slipper race 4a of the pulley 4. A second function of these skirt members 7, 8, 40, 41 is to rotatably retain slipper 3, rollers 5 and spring element 6 and to keep them in alignment with body element 2 of the assembly.

In the case of a spiral type one-way clutch with an outside slipper, when supply of lubricating grease as is present is always thrust outwardly between the overrunning journal bearing surfaces of the clutch assembly by the centrifugal forces arising from the rotation of the clutch. When the slipper engages with an internally located race, such as directly onto an encircled shaft, grease can be provided to the slipper/race interface by packing the entire inner cavity of the clutch.

FIGS. 8a and 8b show a full-section and a frontal view of an accessory drive alternator pulley with a spiral type one-way clutch incorporated between the pulley shive and spindle of an alternator (not shown) having a threaded shaft 42 and alternator bearings 43. FIG. 8c, is an exploded view of the alternator pulley of FIG. 8a. FIG. 8e, shows pulley shive members 4c, 4d of the alternator pulley of FIG. 8a, with axial 34a and knurled grooves 34b on the inner race 4a, and a slipper member 3 with a plain outer surface 34 aligned for positioning within the race 4a.

These Figures show a variation of the preferred spiral clutch of the invention, being provided both with leaf springs 6 in the spiral channels 23 and a pre-loaded elastic condition in the split slipper 3. The inclusion of a leaf spring 6 with relatively low stiffness within the spiral channel 23, located between any two roller elements 5 in a sector of a spiral type one-way clutch assembly, is additionally useful because it maintains the axial alignment of the roller elements 5 with that of the assembly during transition between static and free-wheeling modes.

Thus, a spiral type one-way clutch for use in the hub of an accessory drive pulley has been shown which will achieve two results, first, to isolate the driven accessories from the slow-speed, high frequency torsional oscillations of the engine, and second, to allow the driven accessories to disengage from the engine continuum during periods of rapid deceleration as when caused by an up-shift on the transmission.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property are claimed as follows:

1. A pulley assembly for an automotive accessory belt drive wherein said pulley assembly comprises an outer shive and an inner hub with a spiral type one-way clutch incorporated therebetween capable of operating in either overrunning or lock-up modes, said clutch having a central axis and comprising:

a) an encircling, outer, containment member coupled to said shive section, said containment member having an inner, race to serve as part of a journal bearing;

b) a C-shaped, radially-split, slipper positioned within said containment member and having an outer cylindrical slipper surface thereon that bears against said circular race to serve as the other part of said journal bearing, said slipper:

(1) being in a state of elastic compression so that a sliding resistance results between said race and slipper surface when said clutch operates in overrunning mode; and (2) having been preformed so that in its compressed state within said outer containment member said slipper is provided with an inner slipper spiral surface in the shape of a segment of an involute spiral terminating with an-inwardly extending protrusion to provide a slipper spiral end face;

(c) an inner body incorporated with said hub section and having an outer body spiral surface in the shape of a parallel segment of the same involute spiral as that defining said slipper spiral surface, said body spiral surface terminating with an outwardly extending radial protrusion to provide a body spiral end face;

said inner body and slipper being assembled to form a spiral channel, delimited by said slipper and body spiral surfaces and by the slipper and body spiral end faces and containing a complement of rollers that occupy the width of said channel, the number of rollers present within said channel being limited in number sufficiently to provide that said end faces are displaced from each other arcuately when the clutch is in lock-up mode to ensure confinement of said rollers in said channel.

2. A pulley assembly for an automotive accessory belt drive wherein said pulley assembly comprises an outer shive and an inner cylindrical hub surface with spiral type one-way clutch incorporated therebetween capable of operating in either over-running or lock-up modes, said clutch having a central axis and comprising:

(a) a circular bushing incorporating said hub surface, said bushing having an outer, circular race to serve as part of a journal bearing;

(b) a C-shaped, radially-split, slipper positioned around said race and having an inner cylindrical slipper surface thereon for bearing against said race to serve as the other part of said journal bearing, said slipper:

1) being in a state of elastic expansion so that a sliping resistance results between said race and slipper surface when said clutch operates in over-running mode; and 2) having been preformed so that in its expanded state around said circular bushing and outer race said slipper is provided with an outer slipper spiral surface in the shape of a parallel segment of an involute spiral terminating with an outwardly extending protrusion to provide a slipper spiral end face;

(c) an encircling outer, containment member coupled to said shive section, said containment member having an inner containment member spiral surface in the shape of a segment of the same involute spiral as that defining said slipper spiral surface, said containment member spiral surface terminating with an inwardly extending radial protrusion to provide a containment member spiral endface, said containment member and slipper being assembled to form a spiral channel delimited by said slipper and containment member spiral surfaces and by the slipper and containment member spiral end faces and containing a complement of rollers within said channel that occupy the width of said channel, the number of rollers present within said channel being limited sufficiently to provide that said end faces are displaced from each other arcuately when the clutch is in lock-up mode to ensure confinement of said rollers in said channel.

3. A pulley assembly for an automotive accessory belt drive, wherein said pulley comprises an outer shive and an inner cylindrical hub surface with a spiral type one-way clutch incorporated therebetween capable of operating in either over-running or lock-up modes, said clutch having a central axis and comprising:

(a) a circular bushing incorporating said hub surface, said bushing having an outer, circular race to serve as part of a first journal bearing;

(b) a C-shaped, radially-split, inner first slipper positioned around said race and having a cylindrical inner slipper surface thereon for bearing against said race to serve as the other part of said first journal bearing, said first slipper:

(1) being in a state of elastic expansion so that a sliding resistance results between said race and slipper surface when said clutch operates in over-running running mode;

(2) having been preformed so that in its expanded state around said circular bushing said first slipper is provided with an outer spiral surface in the shape of a segment of an involute spiral terminating with an outwardly extending protrusion to provide a first slipper spiral end face;

(c) an outer containment member encircling said first slipper and coupled to said shire, said outer containment member having an inner, circular journal bearing surface positioned to serve as part of a second journal bearing:

(d) a C-shaped, radially-split, second slipper positioned within said containment member and encircling said first slipper, said second slipper:

(1) having an inner spiral surface in the shape of a parallel segment of the same involute spiral as that defining said first slipper outer spiral surface, said inner spiral surface terminating with an outwardly extending radial protrusion to provide a second slipper spiral end face;

(2) having a circular outer slipper surface to serve as part of a second journal bearing;

(3) being in a state of elastic compression so that a sliding resistance results between said outer slipper surface and said containment member journal bearing surface when said clutch operates in over-running mode and, (4) having been preformed so that in its compressed state Within said containmemt member said second slipper is provided with an inner spiral surface in the shape of a parallel segment of the same involute spiral as that defining the outer spiral surface of said first slipper, said inner spiral surface terminating with an outwardly extending protrusion to provide a second slipper spiral end face;

said first and second slippers being assembled to form a spiral channel delimited by said outer and inner slipper spiral surfaces and by said first and second slipper spiral end faces, and further comprising:

(e) a complement of rollers contained within said channel that occupy the width of said channel, the number of rollers present within said channel being limited sufficiently to provide that said end faces are displaced from each other arcuately when the clutch is in lock-up mode to ensure confinement of said rollers in said channel.

4. A pulley assembly as in claims 1, 2 or 3 wherein said rollers are abutting each other and further comprising resilient means contained within said channel, said rollers and resilient means collectively filling the channel from the slipper spiral end face to the body spiral end face when the clutch is operating in over-running mode to thereby provide a means of maintaining the alignment of the axes of the rollers parallel to the central axis of the clutch.

5. A pulley assembly as in claims 1, 2 or 3 wherein:

(1) said containment member has radial end surfaces;

(2) at least one of said race or slipper surface is provided with lubrication grooves; and (3) grease is contained between said race and slipper surface, and further comprising skirting members fixed to said radial end surfaces to provide a containment means for grease present between said race and slipper surface and within said lubrication grooves.

6. A pulley assembly as in claim 4 wherein:
 (1) said containment member has radial end surfaces;
 (2) at least one of said race or slipper surface is provided with lubrication grooves; and
 (3) grease is contained between said race end slipper surface, and further comprising skirting members fixed to said radial end surfaces to provide a containment means for grease present between said race and slipper surface and within said lubrication grooves.

7. A pulley assembly as defined in claims 1, 2 or 3 wherein said spiral channel is formed as a plurality of spiral channel segments deployed in a ratchet-like configuration.

8. A pulley assembly as defined in claim 4 wherein said spiral channel is formed as a plurality of spiral channel segments deployed in a ratchet-like configuration.

9. A pulley assembly as defined in claim 5 wherein said spiral channel is formed as a plurality of spiral channel segments deployed in a ratchet-like configuration.

10. A pulley assembly as defined in claim 6 wherein said spiral channel is formed as a plurality of spiral channel segments deployed in a ratchet-like configuration.

* * * * *